United States Patent Office 3,732,112
Patented May 8, 1973

3,732,112
INTERMEDIATE MOISTURE FOOD COMPOSITIONS CONTAINING ALIPHATIC 1,3-DIOLS
John W. Frankenfeld, Atlantic Highlands, N.J., and Marcus Karel, Newtonville, and Theodore P. Labuza, North Tewksbury, Mass., assignors to Esso Research and Engineering Company
No Drawing. Filed Nov. 16, 1970, Ser. No. 90,135
Int. Cl. A23l 3/34
U.S. Cl. 99—150 R                19 Claims

ABSTRACT OF THE DISCLOSURE

Intermediate moisture food compositions are prepared utilizing as an ingredient linear aliphatic 1,3-diols having 4 to 15 carbon atoms in the chain and their esters for the inhibition of bacterial, yeast and mold growth.

---

The present invention is concerned generally with intermediate moisture food compositions, which compositions contain as an ingredient a multipurpose compound selected from the class of aliphatic diols and aliphatic diol esters. The additives of the present invention are particularly desirable since they combine effectiveness with desirable physical properties and are nontoxic. These multipurpose additives are particularly effective for the inhibition of bacterial growth and for preventing yeast and mold growth.

During the past decade, considerable progress has been made in the development of intermediate moisture food compositions. These intermediate moisture food compositions comprise a heterogenous group of foods which resemble dry foods in their resistance to microbacterial deterioration but which contain sufficient moisture that they cannot be considered as dry foods. Generally, the intermediate moisture foods are plastic and are easily masticated but do not produce an oral feeling of dryness. Notwithstanding their microbiological stability, intermediate moisture foods are subject to the same types of adverse chemical changes as observed with fully dehydrated foods. As a generalization, foods in the intermediate moisture range are more susceptible to the Maillard reaction than "dry" foods but less susceptible to fat oxidation.

The availability of water for spore germination and microbial growth is closely related to its relative vapor pressure, commonly designated as water activity. Water activity ($A_w$) is defined as the ratio of the vapor pressure (P) of water in the food to the vapor pressure of pure water ($P_o$) at the same temperature. Within the range favorable to the growth of mesophilic microorganisms, $A_w$ is practically independent of temperature.

In general, the intermediate moisture foods with which the present invention is concerned have a total water content in the range from about 20% to 60% by weight. However, this water is present in a form not readily available to microbes in that the "water activity" of the food is low. As pointed out heretofore, "water actiivty" is defined by the following equation:

$$A_w = P/P_o = ERH/100$$

$A_w$ = "water activity"
P = partial pressure of water in food
$P_o$ = saturation pressure of water at specified temperature
ERH = equilibrium relative humiidty The "water activity" of the foods with which the present invention is concerned is in the range of 0.5 to 0.9, preferably in the range from 0.6 to 0.85, such as about 0.7. Generally, a water activity below about 0.85 will prevent the growth of bacteria, while a water activity below about 0.8 will prevent the growth of yeast. Molds are most resistant to a lower water activity, some showing growth in a media with a water activity as low as about 0.60.

The pH of the intermediate food compositions of the present invention is in the range of about 3.5 to 8.0, preferably 4.0 to 6.0. If the pH is above about 6.0, the growth of the microorganism is difficult to control.

The intermediate moisture food compositions presently marketed are rendered stable against deterioration by incorporating into the prepared food one or more representatives of each of two types of ingredients, namely:

(1) An osmotic agent such as salt, sugar, glycerol and the like which has the effect of depressing the "water activity" of the food to levels at which most bacteria and yeasts will not grow; and (2) A mycostatic agent such as sorbic or propionic acids or their salts, which prevents the growth of certain molds and yeasts that are not readily inhibited by the osmotic agents.

Thus, unless these agents are added, most intermediate moisture foods are highly susceptible to spoilage due to the action of bacteria, yeast and molds.

Prior methods of preserving foods by freezing and canning are very expensive. Frozen foods require freezer space for storage and usually cannot be refrozen, and are also less palatable than fresh or canned foods. Dried foods must be rehydrated before consumption and, in most cases, the rehydrated product is not so desirable organoleptically as the original fresh food. Thus, intermediate moisture foods provide an attractive alternative to prior conventional methods of food preservation. They are more convenient to use, require no special storage facilities and are potentially less expensive. When properly formulated, these foods have a high degree of palatability.

However, the development of intermediate moisture foods has been retarded because of the lack of suitable chemical additives. Desirable preservatives, in addition to being effective in controlling water activity and suppressing mold growth, must be safe to use, preferably nutritous, and must impart no undesirable flavor, texture or other organoleptic qualtities to the finished product. The preservatives commonly used today, as hereinbefore mentioned, are deficient in one or more of these requirements. For example, sugar glycerol and propylene glycol and must be used at high levels in the food formulations. are only moderately effective in controlling water activity At these levels, these compounds add to the cost of the product and tend to impart an undesirable sweet flavor to the preparation. Propylene glycol, for example, is too toxic for use in the amounts required. A salt, such as sodium chloride, is effectve but generally cannot be added at high enough levels in foods because of the salty taste and other undesirable qualtities it imparts.

Sugars, such as sucrose, are not only too sweet for soft-moist food formulations but also present another difficulty due to their tendency to promote nonenzymatic browing. Nonenzymatic browning is caused by complex reactions between the amino groups of proteins and the keto groups of sugars (the "Maillard Reaction"). This leads to undesirable darkening of the food product as well as off-odors and flavors. Such interactions can also reduce the nutritional value of foods.

The above-enumerated osmotic agents have very little mycostatic action and a separate mold inhibitor must be added. Commonly sorbic acid, propionic acid or their salts are employed. These adidtives can only be used at low levels. In addition, being acids, they are less effective at neutral pH where many food products must be maintained.

It has now been discovered that certain aliphatic 1,3-diols containing 4 to 15 carbon atoms in the aliphatic chain and their esters are superior additives for soft-moist foods. When added to various food preparations, whether alone or in conjunction with one or more of the above-named chemicals, these particular diols impart many very desirable qualities to the food product. These particular diols maintain such preparations in a bacteria-, yeast- and mold-free state, thereby increasing the shelf life of the product. In addition, they provide softness, or plasticity and enhance the palatability of food formulations. By replacing all or part of the salt, glycerol or sugar in current intermediate moisture foods, these diols obviate the difficulties caused by the strong flavors of such compounds and reduce the incidence of nonenzymatic browning. Finally, they are completely metabolized and actually improve the nutritive properties of the intermediate moisture foods in which they are incorporated.

The linear 1,3-diols or esters contain from about 4 to 15 carbon atoms in the diol portion of the molecule, preferably about 4 to about 10 carbon atoms in the molecule. The ester portions of the molecule contain from 2 to 20 carbon atoms, preferably from about 3 to 10 carbon atoms. The polyols of the present invention contain hydroxy groups on at least the first and third carbon atoms of the molecule. It is this 1,3-dihydroxy configuration which renders these compounds very useful as food additives because of their inherent safety. Polyalcohols with hydroxyl groups in other positions on the carbon chain are more toxic and, therefore, are less useful as additives. In addition to being nontoxic and readily metabolized, the 1,3-diols and esters claimed herein have certain other advantages, making them highly desirable as additives for "intermediate-moisture" or "soft-moist foods;" (1) they are stable, nonvolatile oils and have a long storage and shelf life; (2) they have an appreciable water solubility and are readily emulsified, making them easy to formulate in various food preparations; (3) they are readily absorbed in the intestinal tract and they are completely metabolized.

A summary of the compounds specifically claimed in this invention, along with their caloric densities and some of their physical properties, is presented in Tables I and II. This invention is not limited to these specific compounds. Any 1,3-diol containing 4 to 15 carbon atoms or its mono- or diester is useful for one or more applications as additives for intermediate moisture foods.

TABLE I

| Diol | B.P./mm. (° C.) | Taste, odor, etc. | Theoretical caloric density, kcal./gm.[1] |
|---|---|---|---|
| 1,3-butanediol | 202–203 | Colorless, sweet odor, bitter taste. | 6.7 |
| 1,3-pentanediol | 78–81/0.5 | ___do___ | 7.4 |
| 1,3-hexanediol | 81–82/0.2 | Colorless, slight musty odor, bitter taste. | 7.8 |
| 1,3-heptanediol | 90/0.5 | Colorless, slight musty odor, slight bitter taste. | 8.2 |
| 1,3-octanediol | 87–89/0.3 | Colorless | 8.5 |
| 1,3-nonanediol | 126/1.1 | ___do___ | 8.7 |
| 1,3-decanediol | M.P.[2]=30–31 | ___do___ | 8.9 |
| 1,3-undecanediol | M.P.[2]=41–42 | ___do___ | 9.1 |

[1] Caloric density is the theoretically available energy in kilocalories per gram of the compound.
[2] M.P.=Melting point.

The best esters are those with 5 to 8 carbon hydrocarbon "tail" in either the diol or ester portion of the compound combined with a concentration of polar groups in another part of the molecule, as, for example, 1,3-octanediol-1-monopropionate or 1,3-butanediol-1-monooctanoate. Some especially valuable esters are shown in the following Table II.

TABLE II
Properties of some 1,3-diol esters

| Compound | B. P.,° C. (mm.) | Rat feeding results: Caloric desnity (kcal./g.) | | |
|---|---|---|---|---|
| | | Observed | Calculated | Percent utilized |
| 1,3-butanediol (parent diol): | | | | |
| 1-monopropionate | | | | |
| 1-monoctanoate | 90–95 (0.3) | | | |
| 1-monopalmitate | M.P.[1]=29–31 | | | |
| Dipropionate | 67–70 (0.4) | | | |
| 1,3-hexanediol: | | | | |
| 1-monoacetate | 59–62 (0.15) | 6.7 | 7.0 | 95 |
| 1-monoctanoate | 117–122 (0.3) | 8.4 | 9.0 | 95 |
| 1-monopalmitate | 124–126 (0.2) | 7.3 | 9.3 | 78 |
| Diacetate | 81–82 (0.9) | | | |
| 1,3-heptanediol: | | | | |
| 1-monooctanoate | 85–90 (1 0) | | | |
| 1-monoplamitate | M.P.[1]=38–39 | | | |
| Dipropionate | 90–92 (0.4) | | | |
| 1,3-octanediol-1-mopopropionate | 83–86 (0.3) | | | |

[1] M.P.=Melting point.

The diol and diol esters of the present invention may be prepared by any suitable technique such as by the Reformatsky reaction followed by reduction, or by means of the Prins reaction of formaldehyde and the appropriate olefin.

The amount of diol and diol ester used may vary widely, depending upon the particular diol or diol ester employed. Generally, about 0.05% to 50% by weight of the diol or diol ester may be used, based on the total food composition. If the diol be a lower member such as 1,3-butanediol or 1,3-pentanediol, it is preferred to use 5.0% to 50% by weight, preferably 15% to 40%, such as 20% to 25% by weight based on the total food composition.

Also, the amount used will depend to some extent upon the pH of the intermediate moisture food composition. Thus, if the pH is in the range of about 7.5 to 8.5, about 25% by weight of pentanediol or butanediol will be used.

If an ester of butanediol or pentanediol is used, it is preferred that the amount used be in the range from about 0.05 to 5.0% by weight based on the total food composition.

Also, if the diol be a higher member such as a heptanediol, or a higher diol or an ester of such diols, it is preferred that the concentration be in the range from about 0.05 to 5.0% by weight based on the total food composition.

With respect to certain foods having a high pH, above about 5.0, it is very desirable to utilize a mixture of diols, such as 1,3-butanediol and 1,3-heptanediol. This diol mixture is in the range from about 75% butanediol to 99% butanediol, as compared to 1% heptanediol to 25% heptanediol. A very desirable diol mixture comprises about 95% butanediol and 5% heptanediol. This mixture is used in the range of 5% to 50% by weight, based on the total food composition.

Although all the compounds listed in Tables I and II are valuable as additives for intermediate moisture or soft-moist foods, some are more valuable for certain purposes than others. For example, the lower members of the diol series, 1,3-butanediol and 1,3-pentanediol are excellent humectants, plasticizers and are useful for controlling water activity when used in a concentration of 5 to 50% by weight. They can, therefore, be used to replace all or part of the salt, sugar, glycerol or propylene glycol which are conventionally used as osmotic agents in the soft-moist formulations. These lower 1,3-diols also possess weak mycostatic action. In some formulations, they may be used without added mold inhibitors. This gives them a clear-cut advantage over salt, sugar, glycerol or propylene glycol systems where mycostats must always be added. In food formulations more conducive to mold growth, it is desirable to include a mold inhibitor in the 1,3-butanediol or 1,3-pentanediol systems. Any safe mycostat, for example, propionic acid or sorbic acid my be used. If so, a reduced quantity of such inhibitors can be used compared to the salt, sugar, glycerol or propylene glycol systems.

A very desirable method to enhance the mycostatic action of 1,3-butane or 1,3-pentanediol formulations is by addition of about 0.5% to 3% by weight, based on diol mixture, of a 1,3-diol to 6 or more carbon atoms as, for example, 1,3-heptanediol, or one of the diol esters as, for example, 1,3-octanediol-1-monopropionate. These compounds are superior mold-inhibitors. They have been shown to be significantly more effective than sorbic acid, propionic acid or their salts. These diols and esters are also effective at neutral or high pH where the mold-inhibiting action of organic acids is greately reduced. An additional advantage is that these diols and esters are less toxic and more nutritious than sorbic or propionic acids.

As heretofore mentioned, a very desirable preservative system is obtained by using a mixture of a lower 1,3-diol, for example, 1,3-pentanediol and an ester of a 1,3-pentanediol. Another desirable system is butanediol and an ester of butanediol, such as 1,3-butanediol-1-monopropionate. Another very desirable system or mixture is 1,3-butanediol and 1,3-heptanediol. Although each type of compound is valuable by itself, the combination of the two has unique properties as a preservative system. The percentage of the two types will vary, depending upon the food system involved. Normally the lower diol, serving principally as an osmotic agent, would comprise from about 75 to 99% of the mixture while the higher dioil or ester would comprise 1 to 25%. A very desirable mixture is one containing 90% by weight of the lower diol. The level that such a mixture would be used in a given soft-moist food formulation would range from about 5% to about 50%, preferably from about 20% to 25% by weight.

In order to further illustrate the invention, various tests were carried out, the results of which are described in the following examples and tables of data. In Table II-A are summarized the results of toxicity measurements and nutritional evaluations for a variety of dihydroxy compounds including 1,3-diols. These studies were conducted with rats.

The "observed metabolic energy" values shown in Table II-A were obtained by feeding test groups, of 5-10 rats each, various amounts of several high energy supplements including the 1,3-diols. The basal diets in each case contained sufficient protein, salts, vitamins and minerals to support normal growth. However, the basal diets were deficient in energy (calories). This deficit was, in part, overcome by adding varying amounts of the polyols or of natural energy sources of known caloric densities such as lard, sucrose, or glucose. Curves were drawn by plotting the average change in body weight of test animals against the amount of high energy supplement tested and straight lines were obtained. The slopes of the lines are measures of the energy values of the test compounds. The values given in Table II-A were obtained by measuring the slopes of the lines of the test compounds and comparing them with the slopes of the lines obtained with the standards (lard, glucose or sucrose whose caloric densities are 9.3 Kcal./gm., 3.8 Kcal./gm. and 4.1 Kcal./gm., respectively). The "observed metabolic energy" values were calculated according to the formula:

$$\text{Kcal./gm. of Unknown} = \frac{\text{Slope of unknown line}}{\text{Slope of standard line}} \times \text{Kcal./gm. of standard}$$

The "observed metabolic energy" of a material is a measure of its nutritional value. The higher the energy the greater its value. It is clear from the results given in Table II-A that 1,3-diols are very desirable food components from a nutritional standpoint. Other dihydroxy compounds, however, are not useful nutrients.

TABLE IIA

Nutritional and toxicity data for various diols

| Compounds | Dihydroxy compound | Oral LD$_{50}$ (7 days)[1,2], g./kg. | Observed metabolic energy (kcal./g.) | Percent utilized [3] |
|---|---|---|---|---|
| 1 | 1,3-butanediol | 29 | 6.0 | 88 |
| 2 | 1,3-pentanediol | >20 | 7.8 | 100 |
| 3 | 1,5-pentanediol | 2 | [4] N U | |
| 4 | 1,3-hexanediol | >20 | 6.6 | 85 |
| 5 | 1,5-hexanediol | >20 | [4] N U | |
| 6 | 2,5-hexanediol | 2 | [4] N U | |
| 7 | 1,6-hexanediol | 5 | [4] N U | |
| 8 | 1,3-heptanediol | >20 | 8.0 | 98 |
| 9 | 1,3-octanediol | >20 | 5.8 | 71 |
| 10 | 1,3-nonanediol | >20 | 7.5 | 85 |
| 11 | 1,3-decanediol | >20 | | |
| 12 | 1,3-undecanediol | >20 | | |

[1] Single dose in rats.
[2] LD$_{50}$=Lethal dose for 50% kill.
[3] Determined by dividing observed metabolic energy (kcal.) by theoretical metabolic energy (kcal.).
[4] N.U.=Not utilized.

LD$_{50}$ values are a common measure of the toxicity of a compound. These LD$_{50}$ values represent the lethal dose for a 50% kill of the animals tested per unit weight of the animals. The higher the LD$_{50}$ value, the lower the toxicity. The data in Table II-A establish that the 1,3-configurations of polyalcohols are the least toxic. The LD$_{50}$ values are significantly higher in compounds possessing this structural feature. The LD$_{50}$ values given in Table II-A were obtained by giving test animals graded single doses of the test compounds orally and observing them for one week. The number of deaths in each group was noted and the dose required for a 50% kill taken as the LD$_{50}$ value. In many cases, no death occurred even at the 20 g./kg. level (about as much as one can give a rat in one dose), hence the basis of the ">20" values shown in the table.

The toxicity data with respect to the esters are given in the following Table III. The LD$_{50}$ values for some common food preservatives are also shown. All are significantly more toxic (lower LD$_{50}$ values) than either the diols or the esters.

TABLE III

Toxicity data

| Preservative: | Oral LD$_{50}$ (rats)[1], g./kg. |
|---|---|
| Diol esters (propionates and higher) | >20 |
| Sorbic acid[2] | 10 |
| Solium sorbate[2] | 6–7 |
| Propionic acid[3] | 4 |
| Sodium benzoate[2] | 2–3 |

[1] LD=lethal dose for 50% kill.
[2] Source: Handbook of Toxicology, Vol. I, W. S. Spector, ed., WADC Tech. Rept. #55-16, National Academy of Sciences, National Research Council (1955).
[3] Source: H. F. Smyth et al., Am. Ind. Hyg. Assoc. J., 23, 95 (1962).

In order to further illustrate this invention and, in particular, to establish the superiority of the 1,3-diols and esters as bacteriostats and mold inhibitors, the following microbiological tests were conducted.

EXAMPLE 1

Nutrient broth was used as the basal nutrient medium for the growth of all microorganisms tested. Five ml. of nutrient broth medium (Difco Co.) were placed in 18 mm. x 10 mm. test tubes and the basal medium sterilized with steam at 15 p.s.i. for 15 minutes. After cooling, a sufficient amount of the various compounds were added to the basal medium to give the concentrations used. Normally a final concentration of 0.2, 1 and 2% were used.

After mixing the chemicals with nutrient broth, the tubes were inoculated with the various test microorganisms. The test microorganisms were grown 25 hours earlier in nutrient broth and 1 drop of the dense microbial suspension was added to the tubes.

The tubes containing the chemicals and microorganisms were then incubated at the optimal growth temperature reported for each microorganism tested. Either 37° C. or 30° C. was used. Growth in control tubes, as well as those containing chemicals, was observed visually. After a suitable incubation period, a small aliquot of the test solutions was streaked on an agar plate. This was done in order to confirm the visual readings of the presence of microbial growth.

The results are shown in Tables IV and V. The "minimum effective concentration" is the lowest concentration of additive which effectively prevented growth under the conditions of the test.

TABLE IV

Preservative action against bacteria

| Compound | Minimum effective concentration agianst Salmonella | | |
|---|---|---|---|
| | Staph. aureus, percent | Typhimurium, percent | E. coli percent |
| 1,3-heptanediol | 2 | 1 | 1 |
| 1,3-octanediol-monopropionate | + | 0.2 | 2 |
| 1,3-butanediol-dipropionate | + | 0.2 | 1 |
| K-sorbate | + | 2 | + |
| Ca-propionate | + | + | + |

Note: +=No effect at 2%.

It is apparent from the above that the effectiveness of these materials against a wide spectrum of bacteria is established by the typical data shown in Table IV. In these tests the test compounds are compared to the known commercial preservatives, potassium sorbate and calcium propionate, as to their ability to inhibit growth of various bacteria. It is apparent that several of the compounds are effective at lower concentrations than either of the current additives. Of especial interest is the result that some of the test compounds are active against Salmonella at levels as low as 0.2%. These tests were carried out under conditions conducive to prolific growth of the organisms. Under conditions of normal food storage, the test compounds would be effective at even lower levels. Potassium sorbate was inhibitory in this test only at 2% or above under the test conditions and calcium propionate did not inhibit growth even at the 2% level. Salmonellae are important public health organisms frequently found in foods, especially meat, eggs, and dairy products. All members of the genus are considered as human pathogens.

The present additives are also very effective with respect to mold inhibition which is shown in the following Table V.

TABLE V

Preservative Action Against Molds

| Compound | Minimum effective concentration against— | | | | | | | |
|---|---|---|---|---|---|---|---|---|
| | Trichoderma 12688[1], percent | Botrytis 9435[1], percent | P. roquefortii 6988[1], percent | Fusarium 10911[1], percent | B. fulva, percent | A. niger percent | A. flavus, percent | Bread mold, percent |
| 1,3-pentanediol | + | + | 2 | + | + | + | + | 0 |
| 1,3-heptanediol | 1 | 1 | 0.2 | 1 | 0.2 | 0.2 | 1 | 0 |
| 1,3-pentanediol-monopropionate | 0 | 0 | 1 | 0 | 0 | 1 | 0 | 0.2 |
| 1,3-octanediol-monopropionate | 0.2 | 0.2 | 0.2 | 0.2 | 0.2 | 0.2 | 0.2 | 0 |
| 1,3-butanediol-dipropionate | 0.2 | 0.2 | 0.2 | 1 | 0.2 | 0.2 | 0.2 | 0 |
| 1,3-butanediol-monooctanoate | 0 | 0 | 0.2 | 0 | 0 | 0.2 | 0 | 0.2 |
| 1,3-pentanediol-monooctanoate | 0 | 0 | 1 | 0 | 0 | 0.2 | 0 | 0.2 |
| Potassium sorbate | 2 | 0.2 | 0.2 | 2 | 2 | 2 | 2 | 0 |
| Calcium propionate | + | 1 | 0.2 | + | + | + | + | 0 |

[1] All microorganism numbers—American Type Culture Collection.

Note.—+=No effect at 2%; 0=Not tested.

In Table V some selected diols and esters are compared with potassium sorbate and calcium propionate, commercial mold inhibitors, in effectiveness against various common molds. The lower the "minimum" effective concentration, the more effective the compound. It is apparent that several of the test compounds are significantly better than the currently used preservatives.

EXAMPLE 2

In addition to these tests, some more definitive studies were conducted to determine the effectiveness of certain diols and esters in inhibiting the growth of two common molds under various culture conditions. These tests were carried out as described above except that the pH was varied by the use of suitable buffering agents and, in some experiments, either dextrose or glycerol were added to demonstrate the effectiveness of the diols and esters in different growth media. Molds were chosen because they were of especial importance in the spoilage of intermediate moisture foods.

For purposes of comparison, several commercial food preservatives were tested under the same conditions. The results are shown in Tablets VI and VII. It is apparent from these data that the diols and esters are significantly more effective than the commercial additives. Of especial importance is the finding (Tables VI and VII) that 1,3-heptanediol and the esters are highly active inhibitors of molds, typified by A. niger and P. roquefortii at a pH of 6.8 (nearly neutral) where commercial additives are either only slightly effective or ineffective. This is very important for the preservation of many foods where the pH of the preparation must be near neutrality.

It is apparent from the results of the nutritional and microbiological studies described above that 1,3-diols and their esters are safe and effective antimicrobial preservatives.

TABLE VI

Minimum effective concentration against *Aspergillus niger* under specified conditions

| | Nutrient broth | Dextrose added, wt. percent | | | Glycerol added, wt. percent | | |
|---|---|---|---|---|---|---|---|
| | | 5 | 10 | 20 | 5 | 10 | 20 |
| Potassium sorbate, percent | X | X | X | X | X | X | X |
| Propylene glycol, percent | X | X | X | X | X | X | X |
| 1,3-butanediol, percent | XX | XX | XX | XX | XX | XX | XX |
| Calcium propionate, percent | X | X | X | X | X | X | X |
| 1,3-heptanediol, percent | 0.1 | >0.5;<1.0 | >0.2;<0.5 | >0.5;<1.0 | >0.2;<0.5 | >0.2;<0.5 | >0.5;<1.0 |
| 1,3-butanediol-monooctanoate, percent | 0.05 | 0.05 | 0.05 | 0.05 | 0.05 | 0.05 | 0.05 |
| 1,3-octanediol-monopropionate, percent | 0.05 | 0.05 | 0.05 | 0.05 | >0.05;<0.1 | 0.05 | 0.05 | pH 5.2

| | | | | | | | |
|---|---|---|---|---|---|---|---|
| Potassium sorbate, percent | >1.0;<2.0 | X | X | X | X | X | >0.2;<1.0 |
| Calcium propionate, percent | X | >0.2;<0.5 | >0.2;<0.5 | >0.2;<0.5 | >0.2;<0.5 | >0.2;<0.5 | X |
| 1,3-heptanediol, percent | 0.1 | >0.2;<0.5 | >0.2;<0.5 | >0.2;<0.5 | >0.2;<0.5 | >0.2;<0.5 | >0.2;<0.5 |
| 1,3-butanediol-monooctanoate, percent | 0.1 | 0.1 | 0.1 | 0.1 | 0.1 | 0.1 | 0.1 |
| 1,3-octanediol-monopropionate, percent | 0.1 | 0.1 | 0.1 | 0.1 | 0.1 | 0.1 | 0.1 |

NOTE.—X=Not effective at the highest level tested: 2%; XX=Not effective at the highest level tested: 5%.

TABLE VII

Minimum effective concentration against *Penicillium roquefortii* under specified conditions

| | Nutrient broth | Dextrose added, wt. percent | | | Glycerol added, wt. percent | | |
|---|---|---|---|---|---|---|---|
| | | 5 | 10 | 20 | 5 | 10 | 20 |
| Potassium sorbate, percent | >0.2;<1.0 | >0.2;<1.0 | >0.2;<1.0 | >0.2;<1.0 | >0.2;<1.0 | >0.2;<1.0 | >0.2;<1.0 |
| Calcium propionate, percent | XX | XX | XX | XX | XX | XX | XX |
| 1,3-heptanediol, percent | 0.05 | >0.2;<0.5 | >0.2;<0.5 | >0.2;<0.5 | >0.2;<0.5 | >0.2;<0.5 | >0.2;<0.5 |
| 1,3-butanediol-nonooctanoate, percent | 0.05 | 0.05 | 0.05 | 0.05 | 0.05 | 0.05 | 0.05 |
| 1,3-octanediol-monopropionate, percent | 0.05 | 0.05 | 0.05 | 0.05 | 0.05 | 0.05 | 0.05 | pH 5.2

| | | | | | | | |
|---|---|---|---|---|---|---|---|
| Potassium sorbate, percent | >0.2;<1.0 | >0.2;<1.0 | >0.2;<1.0 | >0.2;<1.0 | >0.2;<1.0 | >0.2;<1.0 | >0.2;>1.0 |
| Calcium propionate, percent | XX | XX | XX | XX | XX | XX | XX |
| 1,3-heptanediol, percent | 0.1 | >0.2;<0.5 | >0.2;<0.5 | >0.2;<0.5 | >0.2;<0.5 | >0.2;<0.5 | >0.2;<0.5 |
| 1,3-butanediol-monoctanoate, percent | 0.1 | 0.1 | 0.1 | 0.1 | 0.1 | 0.1 | 0.1 |
| 1,3-octanediol-monopropionate, percent | 0.1 | 0.1 | 0.1 | 0.1 | 0.1 | 0.1 | 0.1 |

NOTE.—XX=Not effective at the highest level tested: 2%.

EXAMPLE 3

To illustrate the invention still further some typical intermediate moisture food preparations were formulated, various preservative systems were added, the foods were inoculated with microorganisms and were stored at 37° C. for several weeks. The products were then evaluated for the presence of organism growth. The formulations consisted of:

(1) Apple flakes, pH=4.4     G.
    Dehydrated apple flakes _____ 24
    Sucrose _____ 26
    Starch _____ 4.5
    Water _____ 104.5
    Preservatives _____ (1)

[1] Various quant.; see Table VIII.

(2) Banana, pH=4.5
    Strained banana baby food w./tapioca (20% solids)
    Preservatives (various amounts; see Table IX)

(3) Chicken baby food, pH=6.5
    Strained chicken w./broth (22% solids)
    Preservatives (various amounts; see Table X)

The results of these tests are summarized in the following Tables VIII, IX and X.

TABLE VIII

Apple flakes

Preservative:    Microorganism—Growth (+) or no growth (−)
(1) 20% glycerol _____ +
(2) 10% 1,3-butanediol _____ −
(3) 2% 1,3-butanediol _____ +
(4) 0.3% propylene glycol _____ +
(5) 0.3% potassium sorbate _____ −
(6) 0.3% 1,3-heptanediol _____ −
(7) 0.3% 1,3-octanediol-1-monopropionate ____ −
(8) 0.3% 1,3-butanediol-1-monooctanoate ____ −

TABLE IX

Banana baby food

Preservative:    Microorganism—Growth (+) or no growth (−)
(1) Glycerol _____ +
(2) 10% 1,3-butanediol _____ −
(3) 0.5% 1,3-heptanediol* _____ −
(4) 0.5% 1,3-octanediol-1-monopropionate* ___ −
(5) 0.1% potassium sorbate _____ +

*Lower levels not tested.

TABLE X

Chicken baby food

[pH=6.5]

Preservative:    Microorganism—Growth (+) or no growth (−)
(1) 25% glycerol _____ +
(2) 25% 1,3-butanediol _____ −
(3) 25% glycerol
(4) +0.3% potassium sorbate _____ +
(5) +3% 1,3-butanediol _____ −
(6) +0.2% 1,3-heptanediol _____ −
(7) +0.5% 1,3-octanediol-1-monopropionate __ −
(8) +1% 1,3-butanediol-1-monopropionate* __ −
(9) +0.3% potassium sorbate+2% propylene glycol _____ +
(10) +0.3% potassium sorbate+2% 1,3-butanediol _____ −

*Lower levels not tested.

The foregoing results clearly establish the superiority of the preservatives and preservatives claimed in this invention. In a typical low pH system (Table VIII) which is relatively easy to preserve, 1,3-butanediol was clearly superior to glycerol as an osmotic agent. The diol prevented growth of organisms at the 10% level while 20% of the glycerol was ineffective (Table VIII, entries 1 and 2). In addition, 1,3-heptanediol and the two diol esters were at least as effective as the recognized preservative, potassium sorbate, and more effective than propylene glycol.

Similar conclusions can be drawn from the data on the banana baby food tests (Table IX). Here 10% 1,3-butanediol was effective while an equal concentration of glycerol was not (entries 1 and 2). Also, 1,3-heptanediol and 1,3-octanediol-1-monopropionate were effective at very low levels (entries 3 and 4).

The superiority of the present compounds as preservatives is especially clear from the results of tests with the high pH chicken baby food system (Table X). Again, 1,3-butanediol was clearly more effective than glycerol (entry 2 vs. entry 1). The commonly-used combination of 2% propylene glycol+0.3% potassium sorbate (entry 9, Table X) was not able to prevent growth, but 2% 1,3-butanediol+0.3% potassium sorbate (entry 10) was. This indicates the superiority of 1,3-butanediol over propylene glycol. Of especial interest is the fact that 0.2% of 1,3-heptanediol (entry 6) and 0.5% of 1,3-octanediol-1-monopropionate (entry 7) completely inhibited browth while the sample containing 0.3% of potassium sorbate (entry 4) showed heavy growth.

From the foregoing data and examples it is apparent that 1,3-diols and their esters, alone or in combination, provide safe, nutritious and highly-effective systems for the preservation of intermediate moisture foods.

Some typical intermediate moisture food formulations, other than those given above, which illustrate the use of 1,3-diols and 1,3-diol esters are as follows:

GROUP I.—USE OF DIOLS AND ESTERS AS THE SOLE OSMOTIC AND MYCOSTATIC AGENTS

Diced carrots (Formulation 1)

| | Weight percent | |
|---|---|---|
| | Range | Preferred |
| Diced, cooked carrots (solids) | 6-10 | 8 |
| Water | 48-55 | 48 |
| 1,3-butanediol [1] | 40-45 | 42 |
| Salt | 1.5-2.5 | 1.7 |
| 1,3-heptanediol or diol ester [2] | 0.1-0.5 | 0.3 |
| Total | | 100 |

[1] Replaces 35% to 50% of glycerol which imparts a bad taste and/or sucrose which causes over-sweetness and/or salt which causes a salty taste.
[2] Replaces 0.5% of potassium sorbate.

Meat sauce (Formulation 2)

| | Weight percent | |
|---|---|---|
| | Range | Preferred |
| Catsup | 20-25 | 23 |
| Water | 10-20 | 15.5 |
| Vinegar | 12-14 | 13.5 |
| Sucrose | 10-13 | 12 |
| Starch hydrolysate—15 DE | 4-5 | 4.5 |
| Salt | 2-3 | 2.5 |
| Cornstarch | 2-3 | 2.5 |
| Monosodium glutamate | 1-2 | 1 |
| Mustard powder | 0.2 | 0.2 |
| Onion powder | Q.s. | Q.s. |
| Garlic powder | Q.s. | Q.s. |
| 1,3-butanediol [1] | 20-30 | 25 |
| 1,3-heptanediol or diol ester [2] | 0.1-0.5 | 0.3 |
| Total | | 100 |

[1] Replaces 20% to 35% glycerol.
[2] Replaces 0.5% of potassium sorbate.

Chunk tuna (Formulation 3)

| | Weight percent | |
|---|---|---|
| | Range | Preferred |
| Tuna chunks | 20-30 | 26.5 |
| Water | 40-50 | 46.5 |
| Salt | 2-3 | 2.5 |
| 1,3-butanediol [1] | 20-30 | 24.0 |
| 1,3-heptanediol or diol ester [2] | 0.3-1.5 | 0.5 |
| Total | | 100 |

[1] Replaces 30% glycerol.
[2] Replaces 0.7 potassium sorbate.

Macaroni (Formulation 4)

| | Weight percent | |
|---|---|---|
| | Range | Preferred |
| Cooked elbow macaroni | 20-25 | 22.5 |
| Water | 30-40 | 37.5 |
| Salt | 4-8 | 7 |
| 1,3-butanediol [1] | 25.35 | 32.5 |
| 1,3-heptanediol or diol ester [2] | 0.3-1.5 | 0.5 |
| Total | | 100 |

[1] Replaces 35% glycerol.
[2] Replaces 0.5 potassium sorbate.

These foods may be formulated in any way desired. One especially desirable way is to cook, or cold soak the food in a solution of the additives of predetermined composition to leave the desired concentration of additives after drainage, then drain and hold overnight in a refrigerator.

GROUP II.—FORMULATIONS WHICH EMPLOY DIOLS AND ESTERS IN CONJUNCTION WITH OTHER OSMOTIC AGENTS (Formulation 5)

| | Weight percent | |
|---|---|---|
| | Range | Preferred |
| Diced, cooked carrots (10% solids) | 50-70 | 65 |
| Sugar (Sucrose) | 15-35 | 20 |
| 1,3-butanediol [1] | 0-15 | 13 |
| Salt | 1-2 | 1.7 |
| 1,3-heptanediol or diol ester [2] | 0.1-0.3 | 0.3 |
| Total | | 100 |

[1] Replaces 15% sucrose.
[2] Replaces 0.5 potassium sorbate.

Breakfast tart filling (Formulation 6)

| | Weight percent | |
|---|---|---|
| | Range | Preferred |
| Water | 30-40 | 38 |
| Vacuum dried apples (or other fruit) | 10-15 | 12 |
| Sugar (Sucrose) | 0-35 | 30 |
| 1,3-butanediol [1] | 0-25 | 18 |
| Starch | 1-2 | 1.5 |
| Sulfite (sodium salt) | | 0.03 |
| 1,3-heptanediol or diol ester [2] | 0.1-1 | 0.5 |
| Total | | 100 |

[1] Replaces 20% sucrose and/or glycerol.
[2] Replaces 0.5 potassium sorbate.

The above food compositions are intended for human consumption. However, 1,3-diols and diol esters are especially valuable as additives for animal feeds, for example, pet foods.

A typical soft moist pet food is as follows:

Soft moist pet food (Formulation 7)

| Ingredients | Parts by weight | Range |
|---|---|---|
| Tripe | 18.0 | 10-30 |
| Fish (whole cod and smelt) | 6.0 | 4-8 |
| Beef cheek trimmings | 6.0 | 3-9 |
| Soy flakes | 31.5 | 20-40 |
| Dry corn cyrup solids (42 DE) | 11.4 | 5-25 |
| Soy hulls | 3.0 | 0.5-6.0 |
| Dry nonfat milk solids | 2.5 | 0.5-6.0 |
| Bone meal | 2.1 | 0.5-5.0 |
| Dicalcium phosphate | 1.4 | 0.2-3.0 |
| 1,3-butanediol [1] | 13.0 | 2.0-15.0 |
| Sorbitol | 1.0 | 0.5-60 |
| Tallow | 2.0 | 0.5-60 |
| Mono- and diglycerides | 1.0 | 0.2-3.0 |
| Sodium chloride | 0.6 | 0.1-2.0 |
| 1,3-heptanediol or diol ester [2] | 0.3 | 0.1-1.0 |
| Minerals, vitamins, color, etc. | 0.3 | 0.1-1.0 |

[1] Replaces 10% corn syrup, 1% sorbitol and all propylene glycol.
[2] Replaces 0.3% potassium sorbate.

Current pet foods contain large amounts of sucrose which imparts a sweet taste to the meat, objectionable to many pets. 1,3-diols avoid that by cutting down on the sugar.

The antimycotic system in current pet foods is propylene glycol and sorbic acid. A lower 1,3-diol and a higher 1,3-diol or a diol ester is a more effective system. Another typical pet food formulation is as follows:

Pet food—Direct mix (Formulation 8)

| | Weight percent | |
|---|---|---|
| | Range | Preferred |
| Meat and meat by-products | 25–50 | 35.0 |
| Soy flakes | 20–50 | 35.0 |
| Sucrose | 5–40 | 10.0 |
| 1,3-butanediol [1] | 5–40 | 10.0 |
| Milk solids | 2–8 | 4.0 |
| Fat | 1–3 | 2.0 |
| Salt | 1–3 | 2.0 |
| F D & C red dye | 0.006–1.0 | 0.5 |
| Vitamin mineral mix | 0.06–1.0 | 0.5 |
| Ester of 1,3-diol | 0.1–2 | 1.0 |
| Total | | 100.0 |

[1] Replaces 10% sucrose and all of the glycerol.

Other typical food formulations are as follows:

MEAT, FISH OR POULTRY CHUNKS (A) Cook-soak method (Formulation 9)

| | Parts |
|---|---|
| Cooked, drained chunks | 1 |
| Infusion solution | 2 |

Composition of infusion solution

| | Weight percent | |
|---|---|---|
| | Range | Preferred |
| Cream soup base | 5–20 | 15 |
| Sugar (Sucrose) | 0–50 | 15–20 |
| 1,3-butanediol | 0–50 | [1] 30–35 |
| Salt | 0–2 | 1–2 |
| 1,3-heptanediol or diol ester | 0.1–1.0 | 0.5 |

[1] Preferred amount depends on type of meat. Replaces 30%–40% sucrose.

Procedure: Chunks are soaked in infusion solution for a short time, then drained and packaged.

(B) Freeze dried method (Formulation 10)

| | Parts |
|---|---|
| Freeze dried meat chunks | 1 |
| Rehydration solution | 3 |

Composition of rehydration solution

| | Weight percent | |
|---|---|---|
| | Range | Preferred |
| Water | 5–20 | 10–18 |
| Sugar (Sucrose) | 5–20 | 10–15 |
| 1,3-butanediol | 5–40 | [1] 25–30 |
| 1,3-heptanediol or diol ester | 0.1–1.0 | 0.5 |
| Salt | Qs. | Qs |

[1] Preferred amount depends on type of meat, fish or polutry used Replaces sucrose.

Procedure: Freeze dried chunks are rehydrated in solution for approximately five minutes or until water content reaches desired range (25–50%).

Meat, fish or chicken chunks, (A) Cook-soak method (Formulation 11)

| | Weight percent | |
|---|---|---|
| | Range | Preferred |
| Cooked, drained chunks: Soak solution: | | |
| Soup base | 5–40 | 18 |
| Sugar | 0–60 | 40 |
| 1,3-butanediol [1] | 0–60 | 40 |
| Salt | 0–2 | 1.0 |
| Ester | 0.1–2 | 1.0 |
| Total | | 100 |

[1] Replaces 40% sucrose.

Procedure: Mix 1 pt. chicken/2 pt. solution.

(B) Freeze dried method (Formulation 12)

| | Weight percent | |
|---|---|---|
| | Range | Preferred |
| Solution for rehydration: | | |
| Water | 5–50 | 33.0 |
| Sugar | 5–50 | 33.0 |
| 1,3-butanediol [1] | 5–50 | 33.0 |
| Ester | 0.1–2.0 | 1.0 |
| Total | | 100 |

[1] Replaces 30%–40% sucrose.

Procedure: Mix 1 pt. meat/3 pts. solution.

What is claimed is:

1. An intermediate moisture food product having a water content in the range of from about 20% to about 60%, a water activity in the range of 0.5 to 0.9, and a pH in the range of about 3.5 to 8.0, said food composition having from about 0.05% to about 50% by weight of an additive selected from linear aliphatic 1,3-diols having 4 to 15 carbon atoms in the chain, mixtures of said diols, esters of said diols having linear aliphatic acyl groups of 2 to 20 carbon atoms, and mixtures of said diols and said esters.

2. The food product of claim 1 wherein said ester contains from about 3 to 10 carbon atoms in the acyl group.

3. The food product of claim 1 wherein said additive is a 1,3-diol having 4 to 10 carbon atoms and is present in a concentration of from about 5 to 50%.

4. The food product of claim 3 wherein said additive is present in a concentration of from about 20% to about 25% by weight.

5. The food product of claim 1 wherein said additive is a 1,3-diol having greater than 5 carbon atoms in the aliphatic chain and is present in a concentration of about 0.5% to about 5% by weight.

6. The food product of claim 5 wherein said diol is 1,3-heptanediol.

7. The food product of claim 5 wherein said diol is 1,3-nonanediol.

8. The food product of claim 1 wherein said additive is a mixture of diols.

9. The food product of claim 8 wherein said mixture comprises a diol containing 4 to 5 carbon atoms in the aliphatic chain and a diol which contains greater than 5 atoms in the aliphatic chain.

10. The food product of claim 9 wherein said mixture comprises from about 75% to 99% by weight of a diol having 4 to 5 carbon atoms in the aliphatic chain and from about 1% to about 25% by weight of a diol having more than 5 carbon atoms in the chain.

11. The food product of claim 8 wherein said mixture comprises about 90% by weight of 1,3-butanediol and about 10% by weight of 1,3-heptanediol.

12. The food product of claim 1 wherein said additive is 1,3-butanediol.

13. The food product of claim 1 wherein said additive is 1,3-pentanediol.

14. The food product of claim 1 including not more than about 20% by weight of an osmotic agent other than said additive.

15. The food product of claim 14 wherein said osmotic agent is selected from the group consisting of sucrose, glycerol and salt.

16. The food product of claim 1 including not more than 10% by weight of an osmotic agent other than said additive.

17. The food product of claim 16 wherein said osmotic agent is selected from the group consisting of sucrose, glycerol and salt.

18. The food product of claim 1 wherein said additive is a mixture of 1,3-butanediol and 1,3-octanediol-1-monopropionate.

19. The food product of claim 1 wherein said additive is a mixture of 1,3-butanediol and 1,3-butanediol-1-monooctanoate.

References Cited
UNITED STATES PATENTS

| | | | |
|---|---|---|---|
| 3,202,514 | 8/1965 | Burgess et al. | 99—157 X |
| 3,516,838 | 6/1970 | DuPuis | 99—150 R |

RAYMOND N. JONES, Primary Examiner

J. R. HOFFMAN, Assistant Examiner

U.S. Cl. X.R.

99—1, 2 R, 85, 92, 144, 154, 157, 158